US012568554B2

(12) United States Patent　　　　　　(10) Patent No.:　US 12,568,554 B2

Pazos et al.　　　　　　　　　　　　　　(45) Date of Patent:　Mar. 3, 2026

(54) TECHNIQUES FOR VOICE CALL PACKET GROUPING

(71) Applicant: QUALCOMM Incorporated, San Diego, CA (US)

(72) Inventors: Carlos Marcelo Dias Pazos, Carlsbad, CA (US); Leena Zacharias, San Jose, CA (US); Zhibin Dang, San Diego, CA (US); Pravjyot Singh Deogun, Bengaluru (IN); Arvind Vardarajan Santhanam, San Diego, CA (US); Sivaram Srivenkata Palakodety, San Diego, CA (US); Arnaud Meylan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 377 days.

(21) Appl. No.: 18/547,991

(22) PCT Filed: Oct. 21, 2021

(86) PCT No.: PCT/US2021/071963

§ 371 (c)(1),
(2) Date: Aug. 25, 2023

(87) PCT Pub. No.: WO2022/240450

PCT Pub. Date: Nov. 17, 2022

(65) Prior Publication Data

US 2024/0138023 A1　　Apr. 25, 2024
US 2024/0237136 A9　　Jul. 11, 2024

(30) Foreign Application Priority Data

May 14, 2021　(IN) ............................ 202141021836

(51) Int. Cl.
*H04W 76/28*　　　　(2018.01)

(52) U.S. Cl.
CPC ................................... *H04W 76/28* (2018.02)

(58) Field of Classification Search
CPC . H04W 76/28; H04W 72/21; H04W 52/0229; H04W 52/0274; H04W 52/0216; Y02D 30/70
See application file for complete search history.

(56) References Cited

U.S. PATENT DOCUMENTS

2017/0359779 A1 * 12/2017 Wang ................. H04W 52/0209
2021/0144734 A1 * 5/2021 Rashid .................. H04W 76/28

OTHER PUBLICATIONS

International Search Report and Written Opinion—PCT/US2021/071963—ISA/EPO—Mar. 14, 2022.

* cited by examiner

*Primary Examiner* — Ayanah S George

(74) *Attorney, Agent, or Firm* — Harrity & Harrity, LLP

(57)　　　　　ABSTRACT

Various aspects of the present disclosure generally relate to wireless communication. In some aspects, a user equipment (UE) may establish a voice call. The UE may receive a configuration for a discontinuous reception (DRX) cycle indicating at least an ON duration and a DRX cycle duration. The UE may receive a configuration for a scheduling request (SR) indicating an SR period duration for transmitting an SR. The UE may detect that the SR period duration is greater than the DRX cycle duration. The UE may generate, based at least in part on the SR period duration being greater than the DRX cycle duration, a voice data packet to be available for transmission within a threshold time of a start of the ON duration. The UE may transmit the voice data packet on a resource identified by a grant received from the network. Numerous other aspects are described.

28 Claims, 8 Drawing Sheets

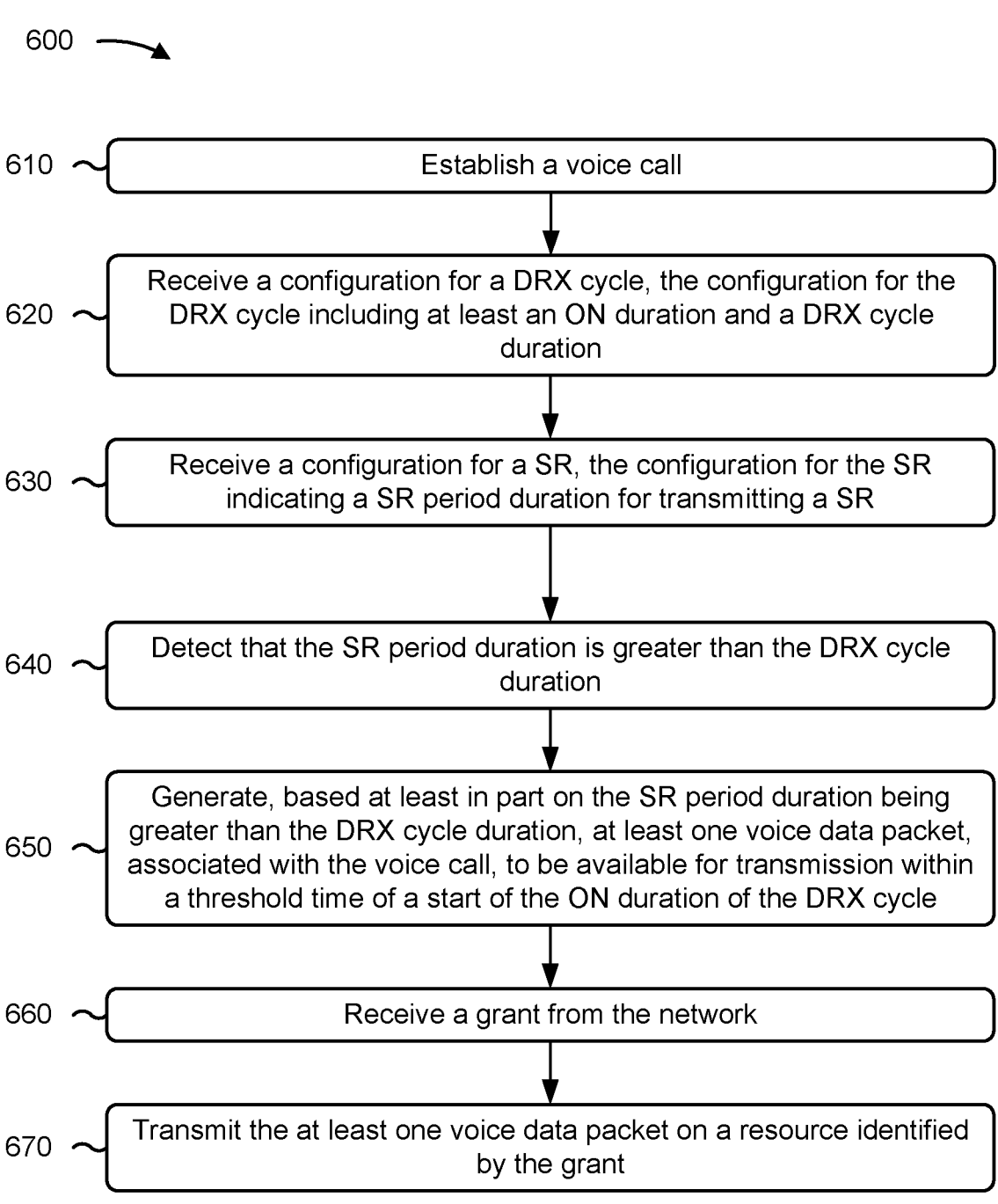

600

610 — Establish a voice call

620 — Receive a configuration for a DRX cycle, the configuration for the DRX cycle including at least an ON duration and a DRX cycle duration 630 — Receive a configuration for a SR, the configuration for the SR indicating a SR period duration for transmitting a SR 640 — Detect that the SR period duration is greater than the DRX cycle duration 650 — Generate, based at least in part on the SR period duration being greater than the DRX cycle duration, at least one voice data packet, associated with the voice call, to be available for transmission within a threshold time of a start of the ON duration of the DRX cycle 660 — Receive a grant from the network 670 — Transmit the at least one voice data packet on a resource identified by the grant

FIG. 6

TECHNIQUES FOR VOICE CALL PACKET GROUPING

CROSS-REFERENCE TO RELATED APPLICATIONS

This Patent Application is a 371 national stage of PCT Application No. PCT/US2021/071963 filed on 21 Oct. 2021, entitled "TECHNIQUES FOR VOICE CALL PACKET GROUPING," which claims priority to India Provisional Patent Application No. 202141021836, filed on 14 May 2021, entitled "TECHNIQUES FOR VOICE CALL PACKET GROUPING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for voice call packet grouping.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a voice call; receiving a configuration for a discontinuous reception (DRX) cycle, the configuration for the DRX cycle including at least an ON duration and a DRX cycle duration; receiving a configuration for a scheduling request (SR), the configuration for the SR indicating an SR period duration for transmitting an SR; detecting that the SR period duration is greater than the DRX cycle duration; generating, based at least in part on the SR period duration being greater than the DRX cycle duration, at least one voice data packet, associated with the voice call, to be available for transmission within a threshold time of a start of the ON duration of the DRX cycle; receiving a grant from a network; and transmitting the at least one voice data packet on a resource identified by the grant.

In some aspects, the threshold time is a first threshold time, and the at least one voice data packet is generated to be available for transmission within the first threshold time prior to an SR occasion that is associated with the ON duration based at least in part on the SR occasion being within a second threshold time of the start of the ON duration.

In some aspects, the threshold time is a first threshold time, and the at least one voice data packet is generated to be available for transmission within the first threshold time of the start of the ON duration based at least in part on the ON duration having no associated SR occasion, having an SR occasion within the ON duration, or having an SR occasion that is separated from the start of the ON duration by at least a second threshold time.

In some aspects, the at least one voice data packet is a first group of packets and the ON duration is a first ON duration that is not associated with an SR occasion, and the method further comprises: generating a second group of packets, associated with the voice call, to be available for transmission prior to an SR occasion that is associated with a second ON duration; transmitting an SR on the SR occasion based at least in part on the second group of packets; and transmitting the second group of packets during the second ON duration.

In some aspects, the at least one voice data packet is generated to be available for transmission within the threshold time of the start of the ON duration irrespective of whether the on duration has an associated SR occasion.

In some aspects, the voice call is a Voice over New Radio call.

In some aspects, the voice call is a Voice over Long Term Evolution call.

In some aspects, a UE for wireless communication includes a memory; and one or more processors, coupled to the memory, configured to: establish a voice call; receive a configuration for a DRX cycle, the configuration for the DRX cycle including at least an ON duration and a DRX cycle duration; receive a configuration for an SR, the configuration for the SR indicating an SR period duration for transmitting an SR; detect that the SR period duration is greater than the DRX cycle duration; generate, based at least in part on the SR period duration being greater than the DRX cycle duration, at least one voice data packet, associated with the voice call, to be available for transmission within a threshold time of a start of the ON duration of the DRX cycle; receive a grant from the network; and transmit the at least one voice data packet on a resource identified by the grant.

In some aspects, the threshold time is a first threshold time, and the at least one voice data packet is generated to be available for transmission within the first threshold time prior to an SR occasion that is associated with the ON duration based at least in part on the SR occasion being within a second threshold time of the start of the ON duration.

In some aspects, the threshold time is a first threshold time, and the at least one voice data packet is generated to be available for transmission within the first threshold time of the start of the ON duration based at least in part on the ON duration having no associated SR occasion, having an SR occasion within the ON duration, or having an SR occasion that is separated from the start of the ON duration by at least a second threshold time.

In some aspects, the at least one voice data packet is a first group of packets and the ON duration is a first ON duration that is not associated with an SR occasion, and the method further comprises: generate a second group of packets, associated with the voice call, to be available for transmission prior to an SR occasion that is associated with a second ON duration; transmit an SR on the SR occasion based at least in part on the second group of packets; and transmit the second group of packets during the second ON duration.

In some aspects, the at least one voice data packet is generated to be available for transmission within the threshold time of the start of the ON duration irrespective of whether the on duration has an associated SR occasion.

In some aspects, the voice call is a Voice over New Radio call.

In some aspects, the voice call is a Voice over Long Term Evolution call.

In some aspects, a non-transitory computer-readable medium storing a set of instructions for wireless communication includes one or more instructions that, when executed by one or more processors of a UE, cause the UE to: establish a voice call; receive a configuration for a DRX cycle, the configuration for the DRX cycle including at least an ON duration and a DRX cycle duration; receive a configuration for an SR, the configuration for the SR indicating an SR period duration for transmitting an SR; detect that the SR period duration is greater than the DRX cycle duration; generate, based at least in part on the SR period duration being greater than the DRX cycle duration, at least one voice data packet, associated with the voice call, to be available for transmission within a threshold time of a start of the ON duration of the DRX cycle; receive a grant from the network; and transmit the at least one voice data packet on a resource identified by the grant.

In some aspects, the threshold time is a first threshold time, and the at least one voice data packet is generated to be available for transmission within the first threshold time prior to an SR occasion that is associated with the ON duration based at least in part on the SR occasion being within a second threshold time of the start of the ON duration.

In some aspects, the threshold time is a first threshold time, and the at least one voice data packet is generated to be available for transmission within the first threshold time of the start of the ON duration based at least in part on the ON duration having no associated SR occasion, having an SR occasion within the ON duration, or having an SR occasion that is separated from the start of the ON duration by at least a second threshold time.

In some aspects, the at least one voice data packet is a first group of packets and the ON duration is a first ON duration that is not associated with an SR occasion, and the method further comprises: generate a second group of packets, associated with the voice call, to be available for transmission prior to an SR occasion that is associated with a second ON duration; transmit an SR on the SR occasion based at least in part on the second group of packets; and transmit the second group of packets during the second ON duration.

In some aspects, the at least one voice data packet is generated to be available for transmission within the threshold time of the start of the ON duration irrespective of whether the on duration has an associated SR occasion.

In some aspects, the voice call is a Voice over New Radio call.

In some aspects, the voice call is a Voice over Long Term Evolution call.

In some aspects, an apparatus for wireless communication includes means for establishing a voice call; means for receiving a configuration for a DRX cycle, the configuration for the DRX cycle including at least an ON duration and a DRX cycle duration; means for receiving a configuration for an SR, the configuration for the SR indicating an SR period duration for transmitting an SR; means for detecting that the SR period duration is greater than the DRX cycle duration; means for generating, based at least in part on the SR period duration being greater than the DRX cycle duration, at least one voice data packet, associated with the voice call, to be available for transmission within a threshold time of a start of the ON duration of the DRX cycle; means for receiving a grant from the network; and means for transmitting the at least one voice data packet on a resource identified by the grant.

In some aspects, the threshold time is a first threshold time, and the at least one voice data packet is generated to be available for transmission within the first threshold time prior to an SR occasion that is associated with the ON duration based at least in part on the SR occasion being within a second threshold time of the start of the ON duration.

In some aspects, the threshold time is a first threshold time, and the at least one voice data packet is generated to be available for transmission within the first threshold time of the start of the ON duration based at least in part on the ON duration having no associated SR occasion, having an SR occasion within the ON duration, or having an SR occasion that is separated from the start of the ON duration by at least a second threshold time.

In some aspects, the at least one voice data packet is a first group of packets and the ON duration is a first ON duration that is not associated with an SR occasion, and the method further comprises: means for generating a second group of packets, associated with the voice call, to be available for transmission prior to an SR occasion that is associated with a second ON duration; means for transmitting an SR on the SR occasion based at least in part on the second group of packets; and means for transmitting the second group of packets during the second ON duration.

In some aspects, the at least one voice data packet is generated to be available for transmission within the threshold time of the start of the ON duration irrespective of whether the on duration has an associated SR occasion.

In some aspects, the voice call is a Voice over New Radio call.

In some aspects, the voice call is a Voice over Long Term Evolution call.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process associated with voice call packet grouping, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
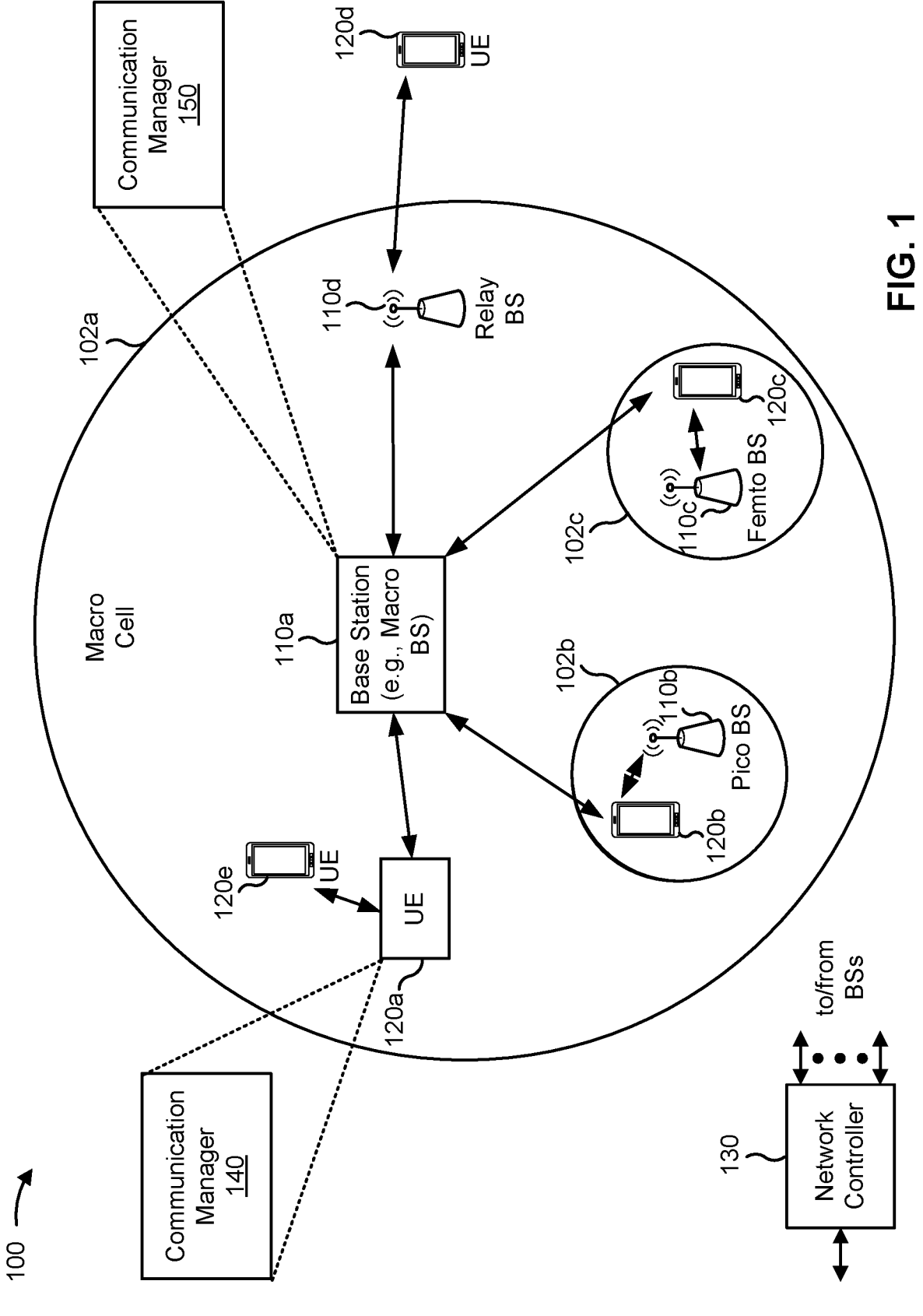
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
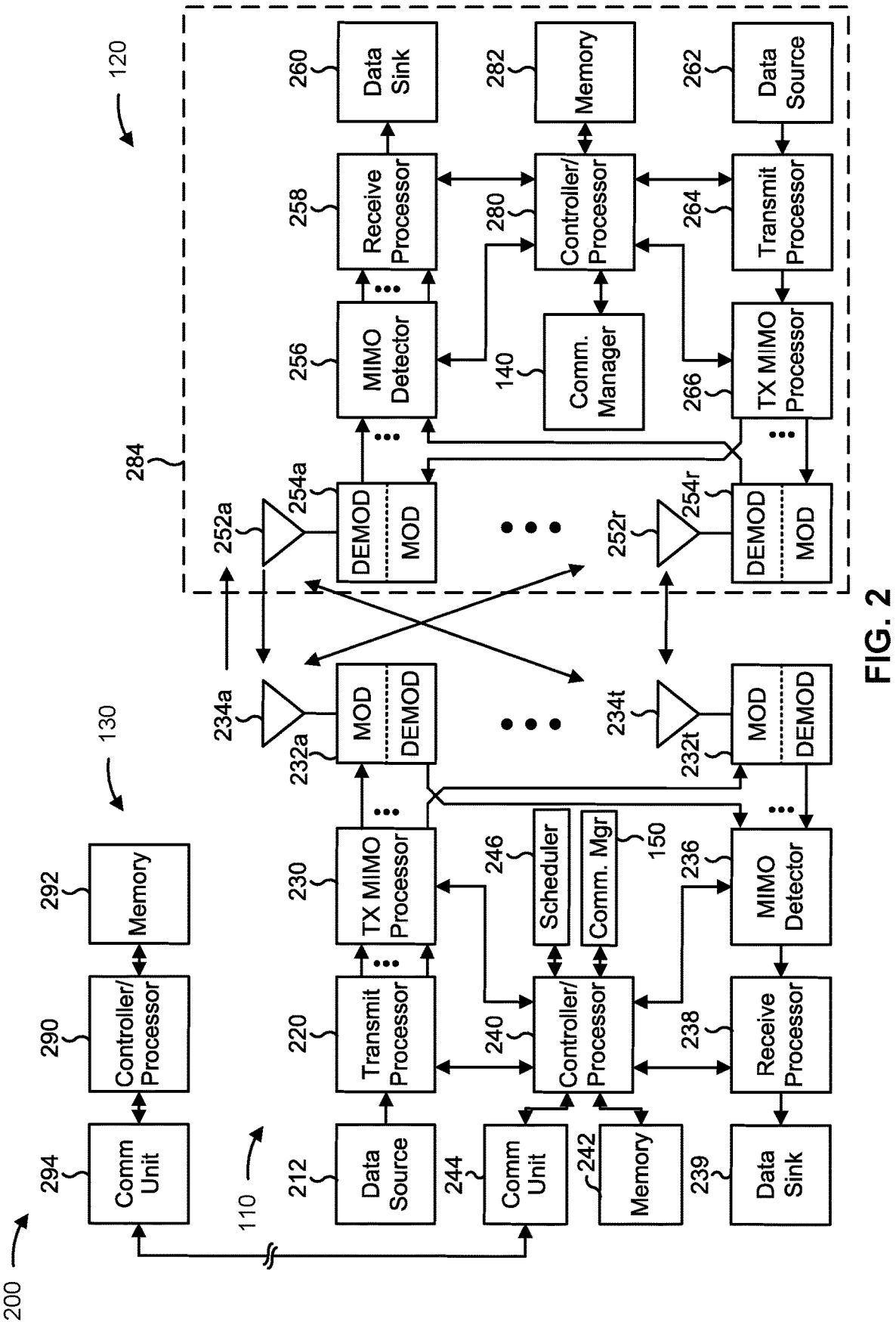
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with voice call packet grouping, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions.

In some aspects, UE 120 may include means for configuring a discontinuous reception (DRX) cycle associated with a DRX periodicity that is shorter than a scheduling request (SR) periodicity associated with transmission of SRs by the UE 120, means for establishing a voice call, means for detecting that the SR periodicity associated with transmission of the SRs by the UE 120 is greater than the DRX periodicity, means for generating a group of packets, associated with the voice call, for transmission within a threshold time of a start of an on duration of the DRX cycle based at least in part on the SR periodicity being greater than the DRX periodicity, means for transmitting the group of packets, or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

As indicated above, FIG. 2 is provided as an example. Other examples may differ from what is described with regard to FIG. 2.

A UE (e.g., UE 120) may be enabled for voice over NR (VoNR), voice over LTE (VoLTE), and/or another packet-based voice calling operation, which enables the UE to transmit voice information in packets (e.g., over LTE channels, over 5G/NR channels, and/or the like). In some aspects, the UE may be configured with a plurality of types of layers, such as a voice layer and a modem layer. The layers may be implemented by one or more components of the UE, such as a receive processor (e.g., receive processor 258), a data source (e.g., data source 262), a transmit processor (e.g., transmit processor 264), a controller/processor (e.g., a controller/processor 280), a memory (e.g., a memory 282), a modem that is implemented by one or more of the receive processor, the transmit processor, the controller/processor, and/or the memory, and/or the like.

In some aspects, the layers may include a voice layer and a modem layer. The voice layer may be implemented by the controller/processor, the memory, the data source, and/or other components. A low-power audio subsystem (LPASS) of the voice layer may generate and receive voice information (e.g., encoded voice data frames, voice call information, VoLTE information, VoNR information, and/or the like), may provide voice information to other layers of the UE, and/or the like.

The modem layer may be made up of one or more non-access stratum (NAS) layers, one or more access stratum (AS) layers, an Internet protocol (IP) layer, and an IP multimedia subsystem (IMS) layer in which packetization of voice information occurs. In this case, the modem (e.g., implemented by the receive processor, the transmit processor, the controller/processor, memory, and/or the like) of the UE may retrieve voice information (e.g., encoded voice frames generated by the LPASS via shared memory) and may perform real-time protocol (RTP) packetization of the voice information to generate packets (e.g., voice data packets) carrying the voice information. The packets may be provided to the AS layers of the modem, which may include layers 1-3 (e.g., a physical layer, a transport layer, a user datagram protocol (UDP)/IP layer, and/or the like). At layers 1-3, the modem may process the packets for transport on the wireless access link to the base station.

In some aspects, to ensure that the modem layer and the voice layer are synchronized to the DRX operation of the UE, the AS layers of the modem may provide, to the IMS layers, an indication of one or more parameters of the modem. In some aspects, the one or more parameters may include an uplink packet offset time, which may be an amount of time the modem takes to receive a packet and transport the packet on the uplink. The uplink packet offset time ensures that the voice layer provides voice information to the modem layer far enough in advance for the modem layer to wake, process, and transmit an SR for packets carrying the voice information.

The uplink packet offset time may be based at least in part on an uplink processing parameter of the modem, a wake-up processing time of the modem, and a timing of SR occasions configured for the UE. An SR occasion is a time resource in which an SR can be transmitted. The uplink processing parameter may indicate an amount of time for performing Layer 1-3 processing of a packet. The wake-up processing time may indicate an amount of time the modem takes to wake up and be ready to transmit a packet. The timing of SR occasions may be determined by the AS layer such that an amount of time exists between an SR occasion and a DRX ON duration of the UE. In some aspects, the SR occasions may have an SR periodicity that indicates how often the SR occasions occur. The SR periodicity may have a length referred to herein as an SR period duration.

The UE may be configured with an SR period duration. SR occasions for the UE may occur at particular times according to the SR period duration. As an example, the UE may be configured with a 10 millisecond SR period duration, where SR occasions occur every 10 milliseconds (e.g., at 24 milliseconds, at 34 milliseconds, and so on); a 20 millisecond SR period duration, where SR occasions occur every 20 milliseconds; or the like.

The UE may be configured with a DRX cycle duration and offset, in which the DRX ON duration for the UE occurs at particular times to mark the start of the DRX cycle. As an example, the UE may be configured with a DRX cycle duration of 40 milliseconds and a 36 millisecond offset, in which case a new DRX cycle starts every 40 milliseconds and at an offset of 36 milliseconds into a radio frame or relative to another starting point, a DRX cycle duration of 80 milliseconds and an offset of 17 milliseconds, or the like. A DRX ON duration timer of the UE may be set to a value (e.g., 10 milliseconds or another value), which may correspond to a length (e.g., an amount of time) of the DRX ON duration.

The IMS layer of the modem may receive the indication of the one or more parameters and may provide, to the voice layer (e.g., the LPASS), an indication of one or more modem parameters. In some aspects, the one or more modem parameters may include a transmission reference time (Tx_Ref_Time) parameter, which may correspond to the uplink packet offset time indicated by the AS layers. In some aspects, the one or more modem parameters may include a reception reference time (Rx_Ref_Time) parameter, which may be an indication of an amount of time after which received packets or frames are available for decoding. The Rx_Ref_Time parameter may be based at least in part on the downlink processing time parameter and the DRX ON duration timer value indicated by the AS layers. In some aspects, the one or more modem parameters may include a DRX cycle parameter, which may indicate one or more of the DRX parameters indicated by the AS layers.

The modem of the UE may receive voice information from the voice layer (e.g., based at least in part on the one or more modem parameters), may generate one or more packets (e.g., one or more voice data packets) carrying the voice information in an IMS layer, and may provide the one or more packets to the AS layers. The modem, at the AS layers, may identify an SR occasion in which to transmit an SR for uplink resources for transmitting the one or more packets.

To transmit the packets, the modem layer of the UE may transmit an SR to a base station (e.g., base station 110). The SR may be a request for uplink resources (e.g., time-domain resources, such as symbols, slots, and/or the like, and/or frequency-domain resources, such as subcarriers, component carriers, and/or the like) in which the UE may transmit the packets. The modem layer may receive an uplink scheduling grant that schedules the uplink resources for the UE based at least in part on the SR.

In some cases, the modem layer may be configured based at least in part on DRX cycles, where the UE periodically transitions to an active state associated with a DRX ON duration to monitor for downlink transmissions (e.g., from a base station) and uplink grant information and to transmit uplink packets, and then returns to an inactive state until the next DRX cycle. In this case, the voice layer and the modem layer of the UE may operate asynchronously, which may cause decreased performance and efficiency of the UE's DRX operation. For example, the voice layer may transmit voice information to the modem layer at a timing that causes the UE (or a modem of the UE) to prematurely transition into an active state to transmit an SR for transmitting packets carrying the voice information. Furthermore, the SR may be transmitted on an SR occasion, which may cause the UE to remain in the active state for a length of time between the SR occasion and the transmission of the voice information to the modem layer. As another example, the voice layer may transmit voice information to the modem layer at a timing that causes the modem to transmit an SR too far in advance of a DRX ON duration of the UE. In either case, the DRX operation of the UE may be interrupted, which may cause decreased performance and efficiency of the UE's DRX operation, may decrease battery performance of the UE, and/or the like.

In some aspects, the voice layer (e.g., the LPASS) may provide voice information to the other layers of the UE using voice call packet grouping, which may include storing the voice call information in shared memory such that the voice call information may be retrieved by the other layers of the UE. The UE may utilize voice call packet grouping to align the uplink IMS/medium access control (IMS/MAC) timelines with respect to the DRX offset and the DRX cycle. For example, the LPASS may store voice call information in the shared memory based at least in part on the uplink packet offset time to enable the modem to wake, process, and transmit an SR for packets carrying the voice call information during an SR occasion occurring during an ON duration of the DRX cycle.

However, in some cases, the SR period duration may be greater than the DRX cycle duration. Because the SR period duration is greater than the DRX cycle duration, an SR occasion may not be present in each DRX cycle. In these cases, the UE may not utilize voice call packet grouping based at least in part on an SR occasion not being present in every DRX cycle. Rather, voice call information may be provided to the modem in a manner that does not align with the ON duration of the DRX cycle. For example, voice call information may be provided to the modem periodically (e.g., every 20 ms, when the DRX cycle is 40 ms). Providing the voice call information in a manner that does not align with the ON duration of the DRX cycle may cause decreased performance and efficiency of the UE's DRX operation. For example, the voice layer may transmit voice call information to the modem layer at a timing that causes the UE to prematurely transition out of a DRX sleep cycle to transmit an SR for transmitting packets carrying the voice call information, which may cause decreased performance and efficiency of the UE's DRX operation, may decrease battery performance of the UE, and/or the like.

Some techniques and apparatuses described herein enable voice call packet grouping to be utilized when the SR period duration is greater than the DRX cycle duration. For example, a UE may receive configuration information from a base station based at least in part on establishing a voice call. The configuration information may include SR configuration information and/or DRX configuration information. When an SR period duration associated with the voice call is greater than a DRX cycle duration of a DRX cycle, the UE may determine an amount of time by which an SR occasion is offset from a start of an ON duration of the DRX cycle based at least in part on the SR configuration information and/or the DRX configuration information. When the amount of time satisfies a threshold (e.g., less than or equal to 5 milliseconds), the UE may provide the voice call information to the modem based at least in part on a time of the SR occasion and the uplink packet offset. When the amount of time fails to satisfy the threshold, the UE may provide the voice call information to the modem based at least in part on a start time of an ON duration of the DRX cycle and the uplink packet offset. In this way, the UE may minimize an amount of time that the UE is in an active mode based at least in part on the UE prematurely transitioning out of a DRX sleep cycle which may cause increased performance and efficiency of the UE's DRX operation, may increase battery performance of the UE, and/or the like.

Figure 3:
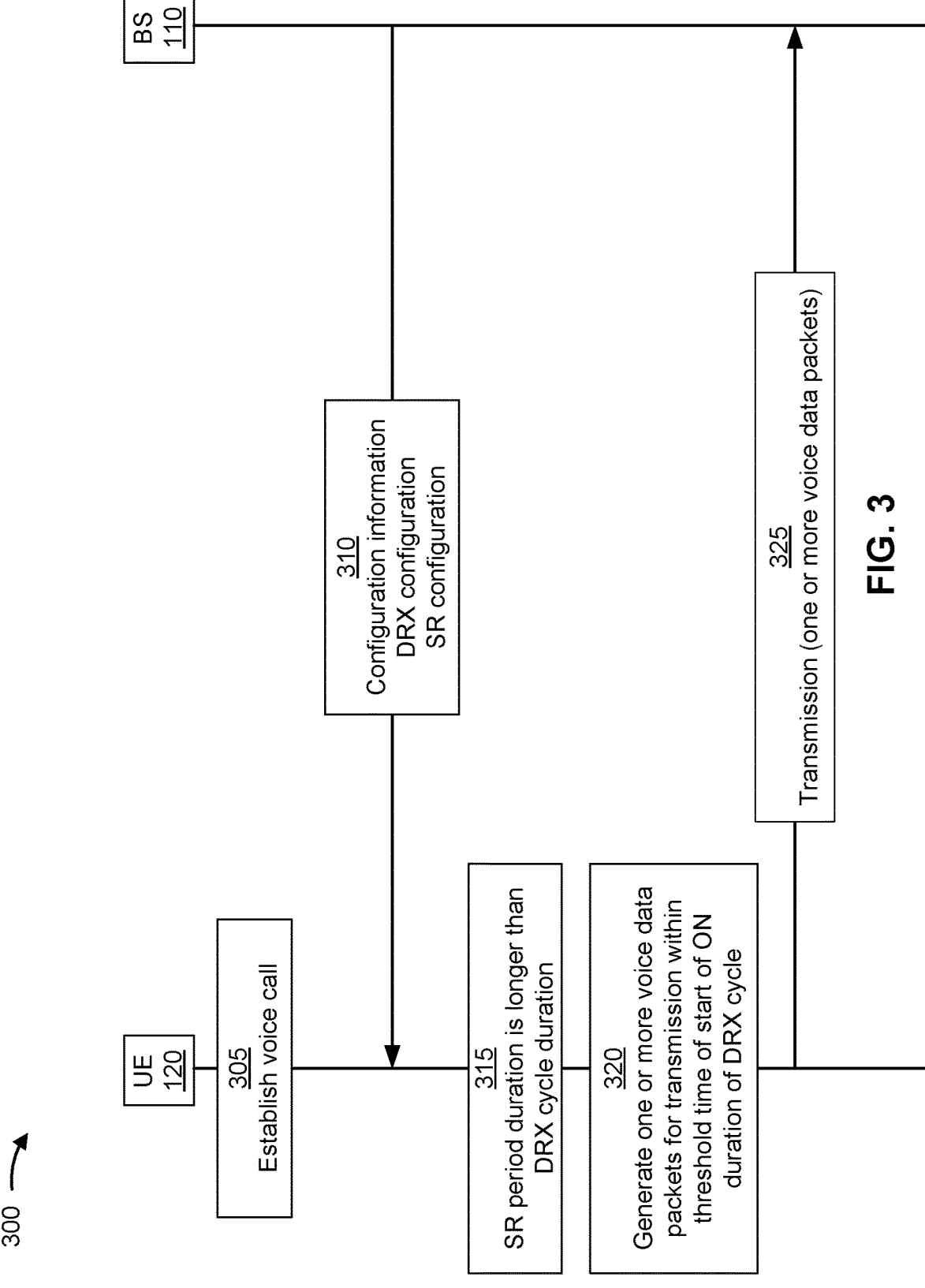
FIGS. 3-5 are diagrams illustrating examples associated with voice call packet grouping, in accordance with the present disclosure.

FIG. 3 is a diagram illustrating an example 300 associated with voice call packet grouping, in accordance with the present disclosure. As shown in FIG. 3, a base station 110 and a UE 120 may communicate with one another. For example, as shown by reference number 305, the UE 120 may communicate with the base station 110 to establish a voice call via the base station 110.

As shown by reference number 310, the UE 120 may receive configuration information from the base station 110. In some aspects, the base station 110 may provide configuration information to the UE 120 based at least in part on the voice call being established. Alternatively, and/or additionally, the UE 120 may receive configuration information from the base station 110 periodically, based at least in part on an occurrence of an event, based at least in part on establishing a connection with the base station 110, based at least in part on the UE 120 requesting the configuration information from the base station 110, or the like. For example, the UE 120 may receive at least part of the configuration information prior to establishing the voice call.

In some aspects, as shown in FIG. 3, the configuration information includes DRX configuration information, such as a DRX configuration. For example, the UE 120 may be configured to perform DRX operations such that the UE 120 transitions between an active state associated with a DRX ON duration and an inactive state in a DRX OFF duration according to a DRX cycle. In some aspects, the DRX configuration information includes one or more DRX parameters associated with the DRX operation of the UE 120. The one or more DRX parameters may include a DRX cycle duration (e.g., which may specify a time duration of the periodic DRX cycles of the UE 120), a DRX cycle start time (e.g., which may specify a symbol, a slot, and/or the like at which a DRX cycle of the UE 120 is to start), a DRX ON duration timer value (e.g., a duration of a DRX ON duration of the UE 120), and/or the like.

In some aspects, as also shown in FIG. 3, the configuration information includes SR configuration information. The SR configuration information may indicate an SR period duration indicating a timing of SR occasions configured for the UE 120 (e.g., every 10 milliseconds, every 20 milliseconds, every 80 milliseconds, or the like), an SR offset indicating a time from which the SR period duration is to be computed (e.g., a number of milliseconds into a radio frame or relative to another reference point), and/or the like. In some aspects, at least part of the SR configuration information may be determined by the UE 120, such as based at least in part on establishing the voice call.

As shown by reference number 315, the UE 120 detects that the SR period duration is longer than the DRX cycle duration. The UE 120 may determine the DRX cycle duration based at least in part on the DRX configuration information. The UE 120 may determine the SR period duration based at least in part on the SR configuration information. The UE 120 may compare the DRX cycle duration and the SR period duration and may determine that the SR period duration is longer than the DRX cycle duration based at least in part on the comparison. In one example, the DRX cycle may have a length of 40 ms and the SR period duration may have a length of 80 ms.

The UE 120 may perform voice call packet grouping based at least in part on the SR period duration being longer than the DRX cycle duration. As shown by reference number 320, the UE 120 generates a group of packets (shown as one or more voice data packets) to be available for transmission within a threshold time of a start of an ON duration of the DRX cycle. For example, the UE 120 may make the group of packets available for transmission within a threshold time of a start of an ON duration of the DRX cycle. In some aspects, the UE 120 may generate the group of packets for transmission based at least in part on an amount of time an SR occasion is offset from the start of an ON duration of the DRX cycle, as described in greater detail with respect to FIGS. 4 and 5. As used herein, "generating a group of packets to be available for transmission" is synonymous with "making a group of packets available for transmission." Furthermore, by "making a group of packets available for transmission at a given time," the UE 120 may make available, at the given time and from an IMS layer of the UE 120, the group of packets for transmission by an AS layer of the UE 120. In some aspects, the UE may generate the group of packets prior to the given time, and may make the group of packets available for transmission at the given time.

As shown by reference number 325, the UE 120 transmits the group of packets to the base station 110. The UE 120 may transmit an SR to the base station 110 during the SR occasion. In some aspects, the UE 120 may receive a grant from the base station 110 based at least in part on the SR. In some aspects, the UE 120 may receive a grant from the base station 110 based in part on the base station proactively providing grants based at least in part on the voice call activity. The UE 120 may transmit the group of packets on a resource identified by the grant.

As indicated above, FIG. 3 is provided as an example. Other examples may differ from what is described with respect to FIG. 3.

Figure 4:
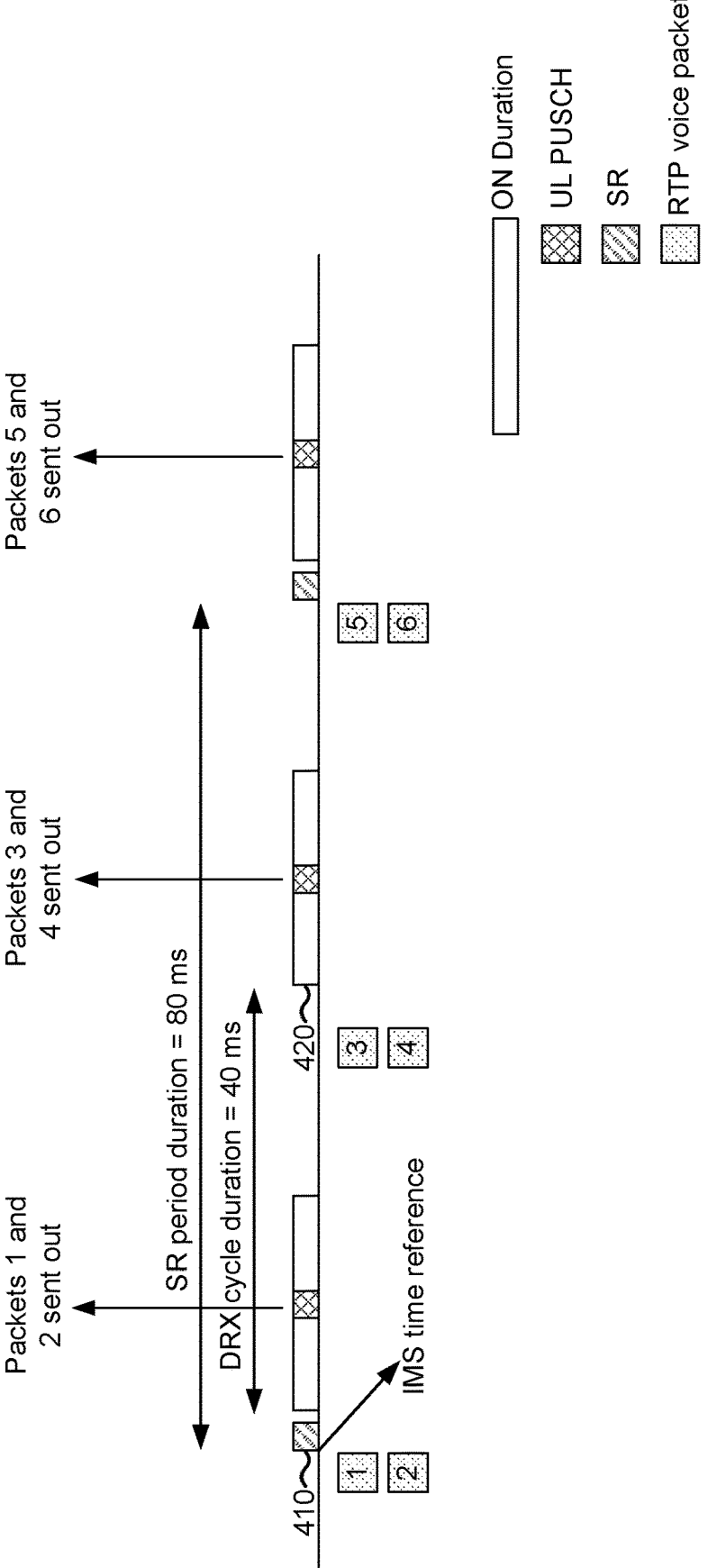

FIG. 4 is a diagram illustrating an example 400 associated with voice call packet grouping, in accordance with the present disclosure. In some aspects, a UE (e.g., UE 120) may communicate with a base station (e.g., base station 110) to establish a voice call (e.g., a VoNR call, a VoLTE call, or the like) between the UE and another UE, as described elsewhere herein. In some aspects the UE may receive configuration information from the base station based at least in part on establishing the voice call. The configuration information may include configuration information for a DRX cycle of the UE (e.g., DRX configuration information) and configuration information for an SR (e.g., SR configuration information). The DRX configuration information may indicate an ON cycle duration, a DRX cycle duration, a DRX cycle offset, and/or the like. The SR configuration information may indicate an SR period duration for transmitting an SR, an SR cycle offset, and/or the like.

In some aspects, as shown in FIG. 4, the SR period duration (e.g., 80 milliseconds, as shown) may be greater than the DRX cycle duration (e.g., 40 milliseconds, as shown). The UE may detect that the SR period duration is greater than the DRX cycle duration based at least in part on the configuration information (e.g., the SR configuration information and the DRX configuration information), as described elsewhere herein.

In some aspects, the UE generates at least one voice data packet (e.g., RTP voice packet 1 and RTP voice packet 2, as shown in FIG. 4), associated with the voice call, to be available for transmission within a length of time (e.g., 7 ms if SRs are within a threshold, say 5 ms, of the ON duration; or 2 ms otherwise) of an ON duration (e.g., a first ON duration) of the DRX cycle based at least in part on the SR period duration being greater than the DRX cycle duration.

In some aspects, the at least one voice data packet is generated to be available for transmission within the first threshold time prior to an SR occasion that is associated with the first ON duration of the DRX cycle. For example, the UE may make the at least one voice data packet (here, RTP voice packets 1 and 2) available prior to an SR occasion shown by reference number 410. In some aspects, the at least one voice data packet is generated to be available for transmission within the first threshold time prior to an SR occasion based at least in part on the SR occasion being within a second threshold time of a start of the first ON duration. As an example, the UE may determine an SR occasion based at least in part on the SR configuration data. The UE may determine that the SR occasion occurs no more than 5 milliseconds prior to a start of the first ON duration. The UE may generate the at least one voice data packet to be available for transmission within the first threshold time prior to the SR occasion based at least in part on the SR occasion being no more than 5 milliseconds prior to the start of the first ON duration.

The UE may transmit an SR associated with the at least one voice data packet to the base station based at least in part on the SR occasion and/or the at least one data packet being generated to be available for transmission within the first threshold time prior to the SR occasion. The UE may receive a grant from the network based at least in part on the SR. The UE may transmit the at least one voice data packet on a resource identified by the grant. As shown in FIG. 4, the UE transmits RTP voice packet 1 and RTP voice packet 2 on an uplink physical uplink shared channel (PUSCH) during the first ON duration of the DRX cycle.

In some aspects, the UE may determine that an ON duration is not associated with an SR occasion. For example, in example 400, the second ON duration of the DRX cycle, shown by reference number 420, is not associated with an SR occasion. The UE may determine that the second ON duration is not associated with an SR occasion based at least in part on an SR occasion not being within the second threshold time of the start of the second ON duration. In some aspects, the UE may determine that an SR occasion is not associated with the second ON duration of the DRX cycle based at least in part on the SR configuration information and/or the DRX configuration information. Alternatively, and/or additionally, the UE may determine that an SR occasion is not associated with the second ON duration of the DRX cycle based at least in part on the SR period duration being at least twice the DRX cycle duration. In some aspects, the UE may receive a proactive grant from the network based at least in part on the activity of voice traffic. The UE may transmit the at least one voice data packet on a resource identified by the proactive grant. As shown in FIG. 4, the UE transmits RTP voice packet 3 and RTP voice packet 4 on a PUSCH during the first ON duration of the DRX cycle.

In some aspects, the UE generates at least one voice data packet (e.g., RTP voice packet 3 and RTP voice packet 4, as shown in FIG. 4), associated with the voice call, to be available for transmission within the same threshold time of the second ON duration of the DRX cycle based at least in part on an SR occasion not being associated with the second ON duration, as the threshold for the first ON duration that had an associated SR. In some aspects, the threshold time corresponds to an uplink packet offset time associated with the UE.

The UE may identify a resource associated with the second ON duration that is available for transmitting the at least one voice data packet. The UE may transmit the at least one voice data packet on the identified resource. For example, the UE may receive a proactive grant from the network based at least in part on the activity of voice traffic. The UE may transmit the at least one voice data packet on a resource identified by the proactive grant. As shown in FIG. 4, the UE transmits RTP voice packet 3 and RTP voice packet 4 on an uplink PUSCH during the first ON duration of the DRX cycle.

The UE may determine that an SR occasion is associated with a third ON duration of the DRX cycle, as described elsewhere herein. The UE may generate at least one voice data packet (e.g., RTP voice packet 5 and RTP voice packet 6, as shown in FIG. 4), associated with the voice call, to be available for transmission within the first threshold time of the SR occasion associated with the third ON duration of the DRX cycle, in a manner similar to that described elsewhere herein.

As indicated above, FIG. 4 is provided as an example. Other examples may differ from what is described with respect to FIG. 4. For example, the SR period could be 160 ms as there could be three DRX cycles that are not associated with an SR.

Figure 5:
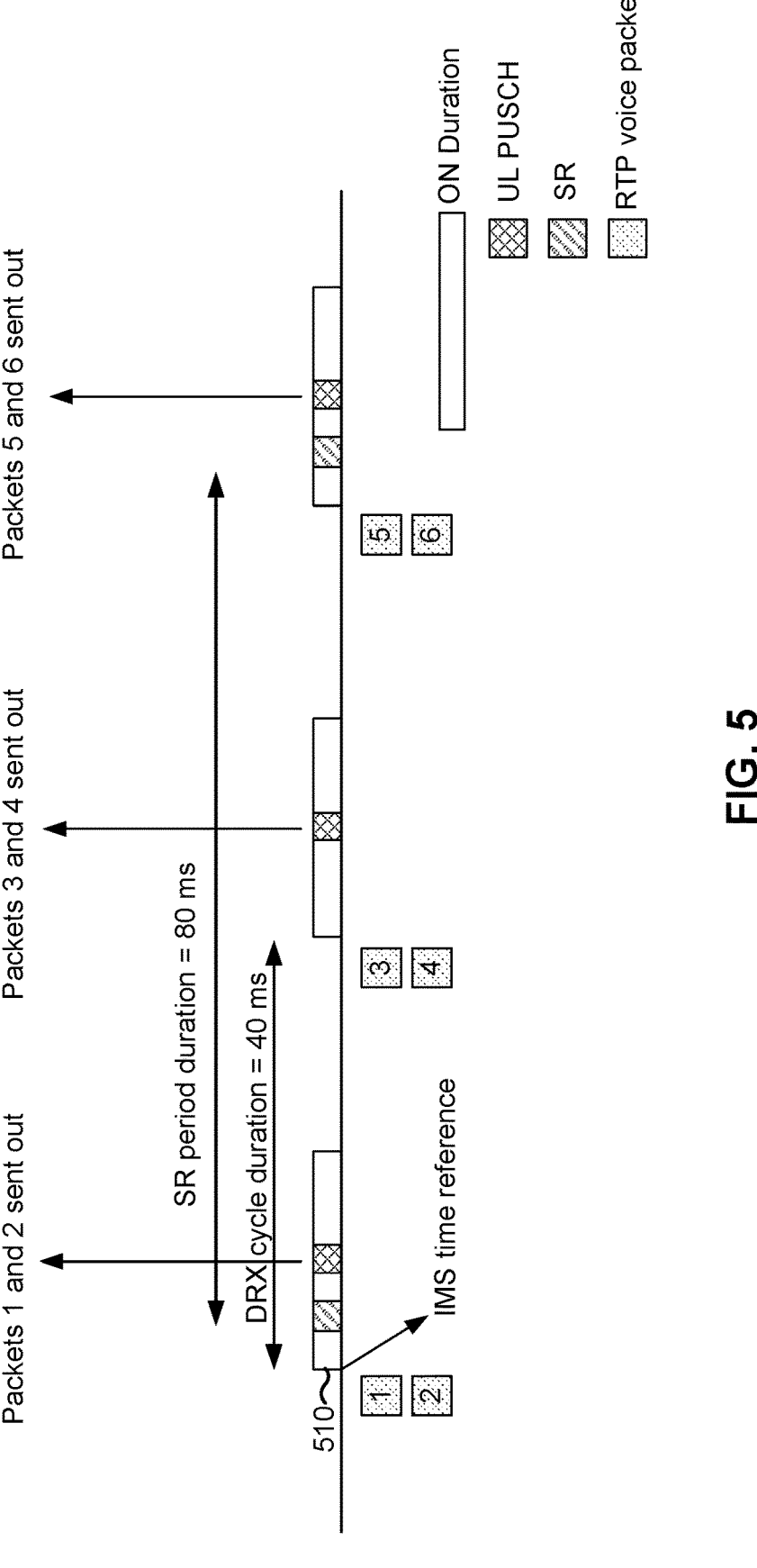

FIG. 5 is a diagram illustrating an example 500 associated with voice call packet grouping, in accordance with the present disclosure. In some aspects, a UE (e.g., UE 120) may communicate with a base station (e.g., base station 110) to establish a voice call (e.g., a VoNR call, a VoLTE call, or the like) between the UE and another UE, as described elsewhere herein. In some aspects, the UE may receive configuration information from the base station based at least in part on establishing the voice call. The configuration information may include configuration information for a DRX cycle of the UE (e.g., DRX configuration information) and configuration information for an SR (e.g., SR configuration information). The DRX configuration information may indicate an ON cycle duration, a DRX cycle duration, a DRX cycle offset, and/or the like. The SR configuration information may indicate an SR period duration for transmitting an SR, an SR cycle offset, and/or the like.

In some aspects, as shown in FIG. 5, the SR period duration (e.g., 80 milliseconds, as shown) may be greater than the DRX cycle duration (e.g., 40 milliseconds, as shown). The UE may detect that the SR period duration is greater than the DRX cycle duration based at least in part on the configuration information (e.g., the SR configuration information and the DRX configuration information), as described elsewhere herein.

In some aspects, the UE generates at least one voice data packet (e.g., RTP voice packet 1 and RTP voice packet 2, as shown in FIG. 5), associated with the voice call, to be available for transmission within a first threshold time of an ON duration 510 (e.g., a first ON duration) of the DRX cycle based at least in part on an SR occasion not being within a second threshold time (e.g., 5 milliseconds) prior to a start of the first ON duration of the DRX cycle. In example 500, the SR occasion is within the first ON duration.

In some aspects, the at least one voice data packet is generated to be available for transmission within the first threshold time prior to the first ON duration of the DRX cycle based at least in part on an SR occurrence being during the first ON duration of the DRX cycle. The UE may determine that the SR occurrence is not within the second threshold time prior to the first ON duration based at least in part on the SR occurrence being within the first ON duration. As an example, the UE may determine an SR occasion based at least in part on the SR configuration data. The UE may determine that the SR occasion occurs more than 5 milliseconds prior to a start of the first ON duration or that the SR occasion is within the first ON duration of the DRX cycle. The UE may generate the at least one voice data packet to be available for transmission within the first threshold time prior to the first ON occasion based at least in part on the SR occasion being more than 5 milliseconds prior to the start of the first ON duration and/or the SR occasion being within the first ON duration of the DRX cycle.

In some aspects, as shown in FIG. 5, the SR occasion is within the first ON duration of the DRX cycle. The UE may transmit an SR to the base station based at least in part on the SR occasion and may receive a grant from the network based at least in part on the SR. The UE may transmit the one or more voice data packets on a resource identified by the grant. As shown in FIG. 5, the UE transmits RTP voice packet 1 and RTP voice packet 2 on an uplink PUSCH during the first ON duration of the DRX cycle, in part due to a proactive uplink transmission grant from the network.

In some aspects, the UE may determine that an SR occasion is not associated with a second ON duration of the DRX cycle. The UE may determine that an SR occasion is not associated with the second ON duration based at least in part on an SR occasion not being within the second threshold time of the start of the second ON duration and/or an SR occasion being within the second ON duration. In some aspects, the UE may determine that an SR occasion is not associated with the second ON duration of the DRX cycle in a manner similar to that described elsewhere herein.

In some aspects, the UE generates at least one voice data packet (e.g., RTP voice packet 3 and RTP voice packet 4, as shown in FIG. 5), associated with the voice call, to be available for transmission within the first threshold time of the second ON duration of the DRX cycle based at least in part on an SR occasion not being associated with the second ON duration. The UE may identify a resource associated with the second ON duration that is available for transmitting the at least one voice data packet in part due to a proactive uplink transmission grant from the network. The UE may transmit the at least one voice data packet on the identified resource. As shown in FIG. 5, the UE transmits RTP voice packet 3 and RTP voice packet 4 on an uplink PUSCH during the second ON duration of the DRX cycle.

The UE may determine that an SR occasion is not associated with a third ON duration of the DRX cycle based at least in part on an SR occurrence being within the third ON duration, as described elsewhere herein. The UE may generate at least one voice data packet (e.g., RTP voice packet 5 and RTP voice packet 6, as shown in FIG. 5), associated with the voice call, to be available for transmission within the first threshold time of the third ON duration of the DRX cycle, in a manner similar to that described elsewhere herein.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with voice call packet grouping.

As shown in FIG. 6, in some aspects, process 600 may include establishing a voice call (block 610). For example, the UE (e.g., using communication manager 140 and/or voice call component 708, depicted in FIG. 7) may establish a voice call, as described above.

As further shown in FIG. 6, in some aspects, process 600 may include receiving a configuration for a DRX cycle, the configuration for the DRX cycle including at least an ON duration and a DRX cycle duration (block 620). For example, the UE (e.g., using communication manager 140 and/or reception component 702, depicted in FIG. 7) may receive a configuration for a DRX cycle, the configuration for the DRX cycle including at least an ON duration and a DRX cycle duration, as described above. The configuration for the DRX cycle may be referred to herein as a DRX configuration.

As further shown in FIG. 6, in some aspects, process 600 may include receiving a configuration for an SR, the configuration for the SR indicating an SR period duration for transmitting an SR (block 630). For example, the UE (e.g., using communication manager 140 and/or reception component 702, depicted in FIG. 7) may receive a configuration for an SR, the configuration for the SR indicating an SR period duration for transmitting an SR, as described above. The configuration for the SR may be referred to herein as an SR configuration.

As further shown in FIG. 6, in some aspects, process 600 may include detecting that the SR period duration is greater than the DRX cycle duration (block 640). For example, the UE (e.g., using communication manager 140 and/or detection component 710, depicted in FIG. 7) may detect that the SR period duration is greater than the DRX cycle duration, as described above.

As further shown in FIG. 6, in some aspects, process 600 may include generating, based at least in part on the SR period duration being greater than the DRX cycle duration, at least one voice data packet, associated with the voice call, to be available for transmission within a threshold time of a start of the ON duration of the DRX cycle (block 650). For example, the UE (e.g., using communication manager 140 and/or generation component 712, depicted in FIG. 7) may generate, based at least in part on the SR period duration being greater than the DRX cycle duration, at least one voice data packet, associated with the voice call, to be available for transmission within a threshold time of a start of the ON duration of the DRX cycle, as described above.

As further shown in FIG. 6, in some aspects, process 600 may include receiving a grant from a network (block 660). For example, the UE (e.g., using communication manager 140 and/or reception component 702, depicted in FIG. 7) may receive a grant from a network, as described above.

As further shown in FIG. 6, in some aspects, process 600 may include transmitting the at least one voice data packet on a resource identified by the grant (block 670). For example, the UE (e.g., using communication manager 140 and/or transmission component 704, depicted in FIG. 7) may transmit the at least one voice data packet on a resource identified by the grant, as described above.

Process 600 may include additional aspects, such as any single aspect or any combination of aspects described below and/or in connection with one or more other processes described elsewhere herein.

In a first aspect, the threshold time is a first threshold time, and wherein the at least one voice data packet is generated to be available for transmission within the first threshold time prior to an SR occasion that is associated with the ON duration based at least in part on the SR occasion being within a second threshold time of the start of the ON duration.

In a second aspect, alone or in combination with the first aspect, the threshold time is a first threshold time, and wherein the at least one voice data packet is generated to be available for transmission within the first threshold time of the start of the ON duration based at least in part on the ON duration having no associated SR occasion, having an SR occasion within the ON duration, or having an SR occasion that is separated from the start of the ON duration by at least a second threshold time.

In a third aspect, alone or in combination with one or more of the first and second aspects, the at least one voice data packet is a first group of packets and the ON duration is a first ON duration that is not associated with an SR occasion, and wherein the method further comprises generating a second group of packets, associated with the voice call, to be available for transmission prior to an SR occasion that is associated with a second ON duration, transmitting an SR on the SR occasion based at least in part on the second group of packets, and transmitting the second group of packets during the second ON duration.

In a fourth aspect, alone or in combination with one or more of the first through third aspects, the at least one voice data packet is generated to be available for transmission within the threshold time of the start of the ON duration irrespective of whether the on duration has an associated SR occasion.

In a fifth aspect, alone or in combination with one or more of the first through fourth aspects, the voice call is a Voice over New Radio call.

In a sixth aspect, alone or in combination with one or more of the first through fifth aspects, the voice call is a Voice over Long Term Evolution call.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
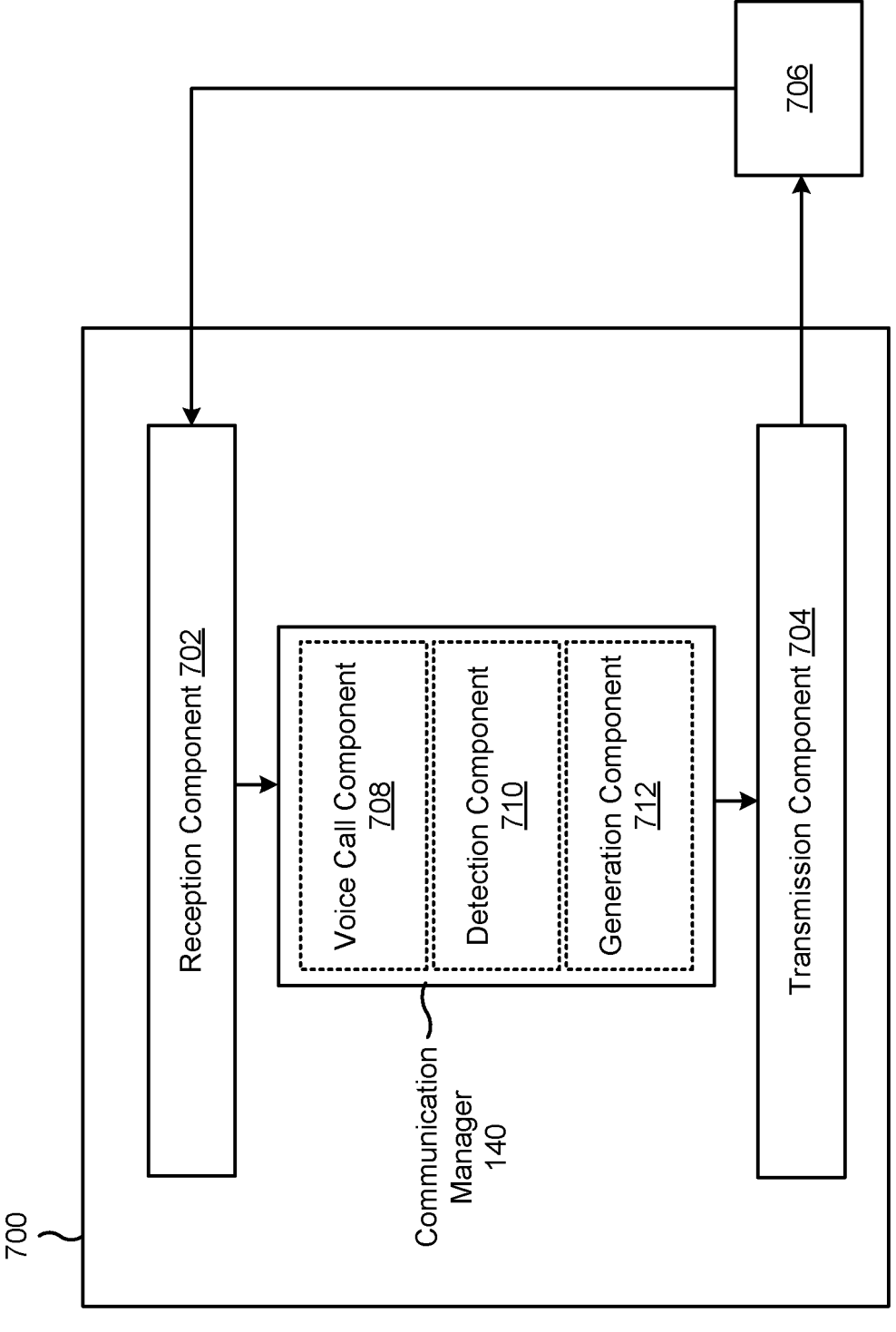
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a voice call component 708, a detection component 710, or a generation component 712, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The voice call component 708 may establish a voice call. The reception component 702 may receive a configuration for a DRX cycle, the configuration for the DRX cycle including at least an ON duration and a DRX cycle duration. The reception component 702 may receive a configuration for an SR, the configuration for the SR indicating an SR period duration for transmitting the SR. The detection component 710 may detect that the SR period duration is greater than the DRX cycle duration. The generation component 712 may generate, based at least in part on the SR period duration being greater than the DRX cycle duration, at least one voice data packet, associated with the voice call, to be available for transmission within a threshold time of a start of the ON duration of the DRX cycle. The reception component 702 may receive a grant from a network. The transmission component 704 may transmit the at least one voice data packet on a resource identified by the grant.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
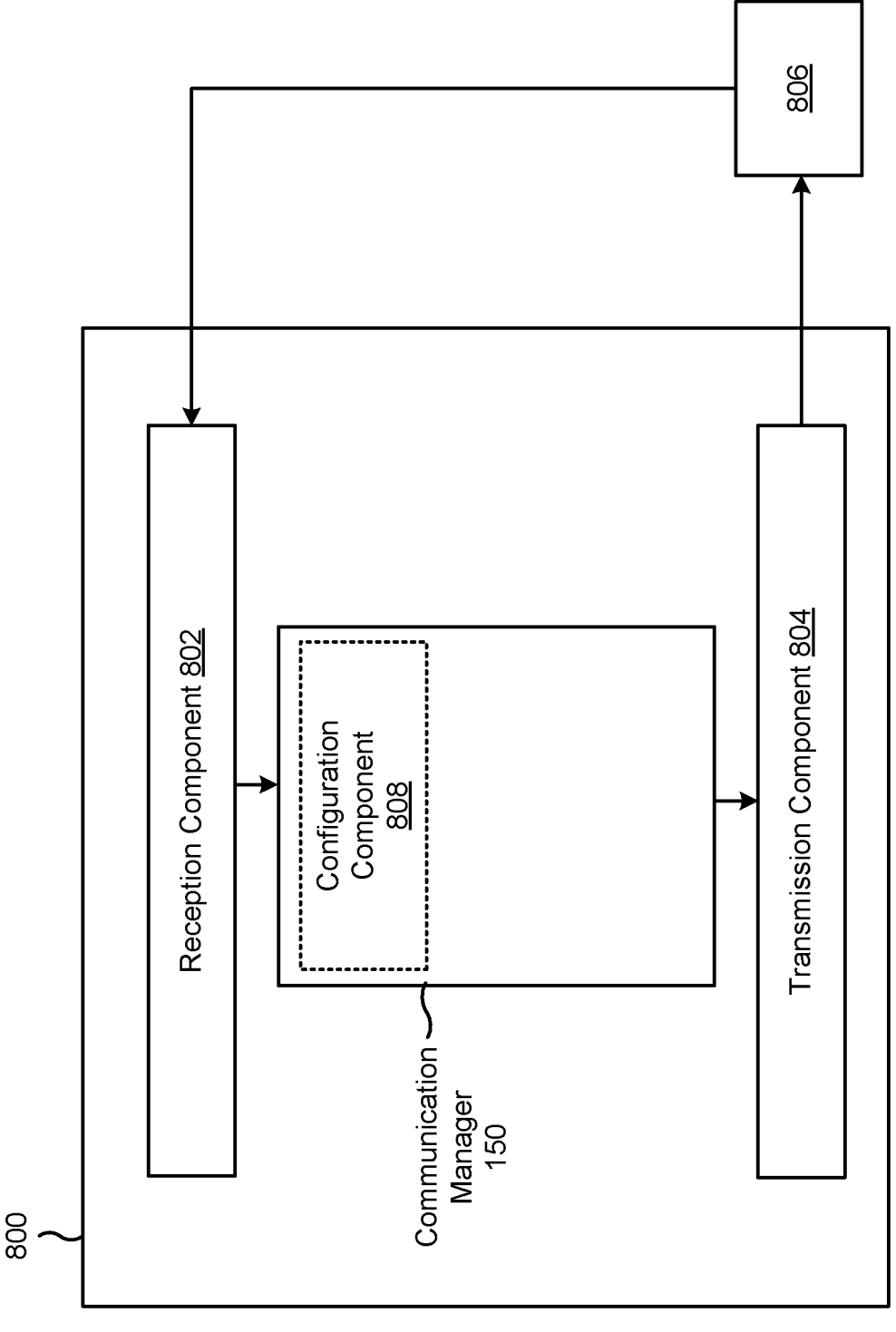

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a configuration component 808 among other examples.

In some aspects, the apparatus 800 may be configured to perform one or more operations described herein in connection with FIGS. 3-5. Additionally, or alternatively, the apparatus 800 may be configured to perform one or more processes described herein, such as one or more configurations transmitted to the UE to support operations of process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The configuration component 808 may establish a dedicated bearer associated with a voice call. The configuration component 808 may cause the transmission component 804 to transmit a configuration for a DRX cycle, the configuration for the DRX cycle including at least an ON duration and a DRX cycle duration. The configuration component 808 may cause the transmission component 804 to transmit a configuration for an SR, the configuration for the SR indicating an SR period duration for transmitting an SR. The reception component 802 may receive an SR from a UE. The configuration component 808 may cause the transmission component 804 to transmit a grant identifying a resource to the UE based at least in part on the SR. The reception component 802 may receive at least one voice data packet on a resource identified by the grant. In some aspects, the configuration component 808 may determine a DRX configuration for a voice call. In some aspects, the configuration component 808 may determine an SR configuration when a voice call is active. In some aspects, based at least in part on receiving an SR or continued voice activity, the configuration component 808 may determine a grant allocation and perform signaling associated with the grant allocation.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: establishing a voice call; receiving a configuration for a DRX cycle, the configuration for the DRX cycle including at least an ON duration and a DRX cycle duration; receiving a configuration for an SR, the configuration for the SR indicating an SR period duration for transmitting an SR; detecting that the SR period duration is greater than the DRX cycle duration; generating, based at least in part on the SR period duration being greater than the DRX cycle duration, at least one voice data packet, associated with the voice call, to be available for transmission within a threshold time of a start of the ON duration of the DRX cycle; receiving a grant from a network; and transmitting the at least one voice data packet on a resource identified by the grant.

Aspect 2: The method of Aspect 1, wherein the threshold time is a first threshold time, and wherein the at least one voice data packet is made available for transmission within the first threshold time prior to an SR occasion that is associated with the ON duration based at least in part on the SR occasion being within a second threshold time of the start of the ON duration.

Aspect 3: The method of one or more of Aspects 1 and 2, wherein the threshold time is a first threshold time, and wherein the at least one voice data packet is made available for transmission within the first threshold time of the start of the ON duration based at least in part on the ON duration having no associated SR occasion, having an SR occasion within the ON duration, or having an SR occasion that is separated from the start of the ON duration by at least a second threshold time.

Aspect 4: The method of one or more of Aspects 1 through 3, wherein the at least one voice data packet is a first group of packets and the ON duration is a first ON duration that is not associated with an SR occasion, and wherein the method further comprises: generating a second group of packets, associated with the voice call, to be available for transmission prior to an SR occasion that is associated with a second ON duration; transmitting an SR on the SR occasion based at least in part on the second group of packets; and transmitting the second group of packets during the second ON duration.

Aspect 5: The method of one or more of Aspects 1 through 4, wherein the at least one voice data packet is made available for transmission within the threshold time of the start of the ON duration irrespective of whether the on duration has an associated SR occasion.

Aspect 6: The method of one or more of Aspects 1 through 5, wherein the voice call is a Voice over New Radio call.

Aspect 7: The method of one or more of Aspects 1 through 6, wherein the voice call is a VoLTE call.

Aspect 8: An apparatus for wireless communication at a device, comprising a processor; memory coupled with the processor; and instructions stored in the memory and executable by the processor to cause the apparatus to perform the method of one or more of Aspects 1 through 7.

Aspect 9: A device for wireless communication, comprising a memory and one or more processors coupled to the memory, the one or more processors configured to perform the method of one or more of Aspects 1 through 7.

Aspect 10: An apparatus for wireless communication, comprising at least one means for performing the method of one or more of Aspects 1 through 7.

Aspect 11: A non-transitory computer-readable medium storing code for wireless communication, the code comprising instructions executable by a processor to perform the method of one or more of Aspects 1 through 7.

Aspect 12: A non-transitory computer-readable medium storing a set of instructions for wireless communication, the set of instructions comprising one or more instructions that, when executed by one or more processors of a device, cause the device to perform the method of one or more of Aspects 1 through 7.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
establishing a voice call;
receiving a configuration for a discontinuous reception (DRX) cycle, the configuration for the DRX cycle including at least an ON duration and a DRX cycle duration;
receiving a configuration for a scheduling request (SR), the configuration for the SR indicating an SR period duration for transmitting an SR;
detecting that the SR period duration is greater than the DRX cycle duration;
generating, based at least in part on the SR period duration being greater than the DRX cycle duration, at least one voice data packet, associated with the voice call, to be available for transmission within a threshold time of a start of the ON duration of the DRX cycle;
receiving a grant from a network; and
transmitting the at least one voice data packet on a resource identified by the grant.

2. The method of claim 1, wherein the threshold time is a first threshold time, and wherein the at least one voice data packet is made available for transmission within the first threshold time prior to an SR occasion that is associated with the ON duration based at least in part on the SR occasion being within a second threshold time of the start of the ON duration.

3. The method of claim 1, wherein the threshold time is a first threshold time, and wherein the at least one voice data packet is made available for transmission within the first threshold time of the start of the ON duration based at least in part on the ON duration having no associated SR occasion, having an SR occasion within the ON duration, or having an SR occasion that is separated from the start of the ON duration by at least a second threshold time.

4. The method of claim 1, wherein the at least one voice data packet is a first group of packets and the ON duration is a first ON duration that is not associated with an SR occasion, and wherein the method further comprises:
generating a second group of packets, associated with the voice call, to be available for transmission prior to an SR occasion that is associated with a second ON duration;
transmitting an SR on the SR occasion based at least in part on the second group of packets; and
transmitting the second group of packets during the second ON duration.

5. The method of claim 1, wherein the at least one voice data packet is made available for transmission within the threshold time of the start of the ON duration irrespective of whether the on duration has an associated SR occasion.

6. The method of claim 1, wherein the voice call is a Voice over New Radio call.

7. The method of claim 1, wherein the voice call is a Voice over Long Term Evolution call.

8. A user equipment (UE) for wireless communication, comprising:

a memory; and one or more processors, coupled to the memory, configured to:

establish a voice call;

receive a configuration for a discontinuous reception (DRX) cycle, the configuration for the DRX cycle including at least an ON duration and a DRX cycle duration;

receive a configuration for a scheduling request (SR), the configuration for the SR indicating an SR period duration for transmitting an SR;

detect that the SR period duration is greater than the DRX cycle duration;

generate, based at least in part on the SR period duration being greater than the DRX cycle duration, at least one voice data packet, associated with the voice call, to be available for transmission within a threshold time of a start of the ON duration of the DRX cycle;

receive a grant from a network; and transmit the at least one voice data packet on a resource identified by the grant.

9. The UE of claim 8, wherein the threshold time is a first threshold time, and wherein the at least one voice data packet is made available for transmission within the first threshold time prior to an SR occasion that is associated with the ON duration based at least in part on the SR occasion being within a second threshold time of the start of the ON duration.

10. The UE of claim 8, wherein the threshold time is a first threshold time, and wherein the at least one voice data packet is made available for transmission within the first threshold time of the start of the ON duration based at least in part on the ON duration having no associated SR occasion, having an SR occasion within the ON duration, or having an SR occasion that is separated from the start of the ON duration by at least a second threshold time.

11. The UE of claim 8, wherein the at least one voice data packet is a first group of packets and the ON duration is a first ON duration that is not associated with an SR occasion, and wherein one or more processors are further configured to:

generate a second group of packets, associated with the voice call, to be available for transmission prior to an SR occasion that is associated with a second ON duration;

transmit an SR on the SR occasion based at least in part on the second group of packets; and transmit the second group of packets during the second ON duration.

12. The UE of claim 8, wherein the at least one voice data packet is made available for transmission within the threshold time of the start of the ON duration irrespective of whether the on duration has an associated SR occasion.

13. The UE of claim 8, wherein the voice call is a Voice over New Radio call.

14. The UE of claim 8, wherein the voice call is a Voice over Long Term Evolution call.

15. A non-transitory computer-readable medium storing a set of instructions for wireless communication, the set of instructions comprising:

one or more instructions that, when executed by one or more processors of a user equipment (UE), cause the UE to:

establish a voice call;

receive a configuration for a discontinuous reception (DRX) cycle, the configuration for the DRX cycle including at least an ON duration and a DRX cycle duration;

receive a configuration for a scheduling request (SR), the configuration for the SR indicating an SR period duration for transmitting an SR;

detect that the SR period duration is greater than the DRX cycle duration;

generate, based at least in part on the SR period duration being greater than the DRX cycle duration, at least one voice data packet, associated with the voice call, to be available for transmission within a threshold time of a start of the ON duration of the DRX cycle;

receive a grant from a network; and transmit the at least one voice data packet on a resource identified by the grant.

16. The non-transitory computer-readable medium of claim 15, wherein the threshold time is a first threshold time, and wherein the at least one voice data packet is made available for transmission within the first threshold time prior to an SR occasion that is associated with the ON duration based at least in part on the SR occasion being within a second threshold time of the start of the ON duration.

17. The non-transitory computer-readable medium of claim 15, wherein the threshold time is a first threshold time, and wherein the at least one voice data packet is made available for transmission within the first threshold time of the start of the ON duration based at least in part on the ON duration having no associated SR occasion, having an SR occasion within the ON duration, or having an SR occasion that is separated from the start of the ON duration by at least a second threshold time.

18. The non-transitory computer-readable medium of claim 15, wherein the at least one voice data packet is a first group of packets and the ON duration is a first ON duration that is not associated with an SR occasion, and wherein the one or more instructions, when executed by the one or more processors, cause the UE further to:

generate a second group of packets, associated with the voice call, to be available for transmission prior to an SR occasion that is associated with a second ON duration;

transmit an SR on the SR occasion based at least in part on the second group of packets; and transmit the second group of packets during the second ON duration.

19. The non-transitory computer-readable medium of claim 15, wherein the at least one voice data packet is made available for transmission within the threshold time of the start of the ON duration irrespective of whether the on duration has an associated SR occasion.

20. The non-transitory computer-readable medium of claim 15, wherein the voice call is a Voice over New Radio call.

21. The non-transitory computer-readable medium of claim 15, wherein the voice call is a Voice over Long Term Evolution call.

22. An apparatus for wireless communication, comprising:

means for establishing a voice call;

means for receiving a configuration for a discontinuous reception (DRX) cycle, the configuration for the DRX cycle including at least an ON duration and a DRX cycle duration;

means for receiving a configuration for a scheduling request (SR), the configuration for the SR indicating an SR period duration for transmitting an SR;

means for detecting that the SR period duration is greater than the DRX cycle duration;

means for generating, based at least in part on the SR period duration being greater than the DRX cycle duration, at least one voice data packet, associated with the voice call, to be available for transmission within a threshold time of a start of the ON duration of the DRX cycle;

means for receiving a grant from a network; and means for transmitting the at least one voice data packet on a resource identified by the grant.

23. The apparatus of claim 22, wherein the threshold time is a first threshold time, and wherein the at least one voice data packet is made available for transmission within the first threshold time prior to an SR occasion that is associated with the ON duration based at least in part on the SR occasion being within a second threshold time of the start of the ON duration.

24. The apparatus of claim 22, wherein the threshold time is a first threshold time, and wherein the at least one voice data packet is made available for transmission within the first threshold time of the start of the ON duration based at least in part on the ON duration having no associated SR occasion, having an SR occasion within the ON duration, or having an SR occasion that is separated from the start of the ON duration by at least a second threshold time.

25. The apparatus of claim 22, wherein the at least one voice data packet is a first group of packets and the ON duration is a first ON duration that is not associated with an SR occasion, and wherein the apparatus further comprises:

means for generating a second group of packets, associated with the voice call, to be available for transmission prior to an SR occasion that is associated with a second ON duration;

means for transmitting an SR on the SR occasion based at least in part on the second group of packets; and means for transmitting the second group of packets during the second ON duration.

26. The apparatus of claim 22, wherein the at least one voice data packet is generated to be available for transmission within the threshold time of the start of the ON duration irrespective of whether the on duration has an associated SR occasion.

27. The apparatus of claim 22, wherein the voice call is a Voice over New Radio call.

28. The apparatus of claim 22, wherein the voice call is a Voice over Long Term Evolution call.

* * * * *